Aug. 18, 1936.   W. DIETERLE ET AL   2,051,134
SENSITIZING SILVER HALIDE EMULSIONS
Filed Jan. 11, 1932

*Fig. 1*

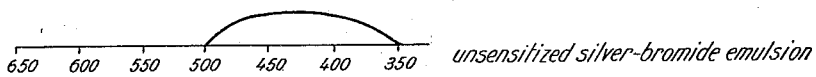
unsensitized silver-bromide emulsion

*Fig. 2*

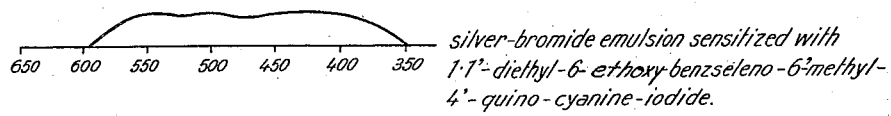
silver-bromide emulsion sensitized with
1·1'-diethyl-6-ethoxy-benzseleno-6'-methyl-
4'-quino-cyanine-iodide.

*Fig. 3*

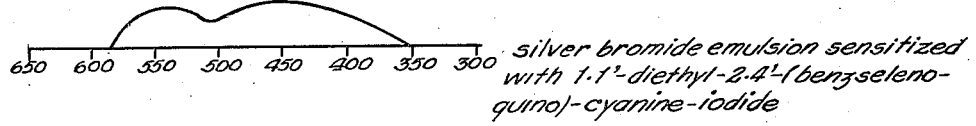
silver bromide emulsion sensitized
with 1·1'-diethyl-2·4'-(benzseleno-
quino)-cyanine-iodide

*Fig. 4*

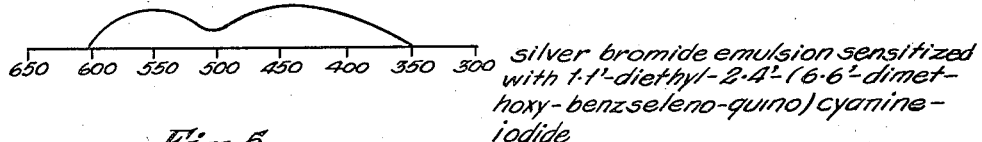
silver bromide emulsion sensitized
with 1·1'-diethyl-2·4'-(6·6'-dimet-
hoxy-benzseleno-quino)cyanine-
iodide

*Fig. 5*

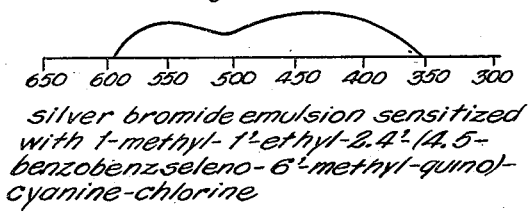
silver bromide emulsion sensitized
with 1-methyl-1'-ethyl-2·4'-(4,5-
benzobenzseleno-6'-methyl-quino)-
cyanine-chlorine Walter Dieterle,
Walter Jeh,
Philip S. Hopkins,
Inventors:
By
Attorney.

Patented Aug. 18, 1936

2,051,134

UNITED STATES PATENT OFFICE 2,051,134

SENSITIZING SILVER-HALIDE EMULSIONS

Walter Dieterle and Walter Zeh, Dessau in Anhalt, Germany, assignors to Agfa Ansco Corporation, Binghamton, N. Y., a corporation of New York Application January 11, 1932, Serial No. 586,055
In Germany January 10, 1931

10 Claims. (Cl. 95—7)

(Granted under the provisions of sec. 14, act of March 2, 1927; 357 O. G. 5)

Our present invention relates to sensitizing of photographic emulsions.

One of its objects is to provide such an emulsion the sensitivity of which is raised over the range of wave lengths to which the emulsion is normally sensitive. Further objects will be seen from the detailed specification following hereafter.

Reference is made to the accompanying drawing in which Fig. 1 represents an unsensitized silver-bromide emulsion and Fig. 2 the same emulsion sensitized with our new sensitizing dyes.

We have found that a silver-halide emulsion containing a selenoisocyanine corresponding to the general formula Formula 1

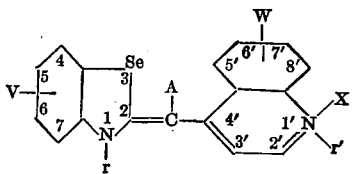

V and W=H, alkyl, oxalkyl, substituted amino groups, benzene, halide
r and r'=alkyl,
A=H, alkyl
X=halide, perchlorate, para-toluene sulfonate, alkylosulfate, nitrate,
is sensitive to the green and greenish-yellow region of the spectrum.

The emulsion thus attains a quite remarkable sensitiveness to the region of the spectrum comprising waves of about 500μμ to 600μμ. Compared with the known dyes containing in their molecule the thiazole nucleus our new dyes containing in their molecule the selenazole nucleus have the advantage that the range of sensibility imparted to the emulsion having incorporated the same is displaced towards the region of the longer waves by about 10μμ. The dyes are especially adapted for orthochromatic sensitizing.

In general Formula 1, V and W may take any position in the benzene nuclei, the 5 and 6 position, and the 6' and 7' position are preferred. V and W may represent alkyl such as methyl, ethyl etc., or an alkoxy group, for instance, a methoxy or ethoxy group, or a substituted amino group, or halide, or benzene. r and r' may be alkyl, for example methyl, ethyl, propyl etc. A may represent H, methyl or ethyl. X can be any suitable anion that will precipitate the dye, for instance, a halide, paratoluene sulfonate, alkylosulfonate, alkylosulfate, perchlorate, nitrate or the like.

In the accompanying graph there are reproduced two spectrograms of the same silver-bromide gelatin emulsion.

Fig. 1 represents the intensity curve of a silver-bromide emulsion without a sensitizer.

Fig. 2 represents the intensity curve of the same silver-bromide emulsion sensitized with 1.1'-diethyl - 2.4' - (6 - ethoxy-benzseleno - 6' - methyl-quino) -cyanine-iodide.

Fig. 3 shows the intensity curve of the same emulsion but sensitized with 1.1'-diethyl-2.4'-(benzseleno-quino) -cyanine-iodide.

Fig. 4 shows the intensity curve of the same emulsion but sensitized with 1.1'-diethyl-2.4'-(6.6'-dimethoxy-benzseleno-quino) -cyanine iodide, and Fig. 5 shows the intensity curve of the same emulsion but sensitized with 1-methyl-1'-ethyl-2.4'-(4.5-benzobenzseleno-6'-methyl-quino) -cyanine-chloride.

In these spectrograms the abscissae are graduated in millimicrons (μμ) while the ordinates are graduated in divisions denoting the blackening of the tested film. The blackenings are taken by exposing the film in a diffraction grating spectrograph of Carl Zeiss, Jena, provided with a Rowland diffraction grating and illuminating with a nitra lamp of 100 watt through a stage slot.

When comparing the curves the superiority of our new dyes will be easily seen. It is seen that the spectrogram of the emulsion sensitized with a selenoisocyanine is distinguished by a characteristic form from the spectrogram of the emulsion which has not been sensitized or has been sensitized with another dyestuff.

The dyes are obtainable according to the desired solubility in form of the bromide, iodide, perchlorate etc. and are used in a quantity as usual for the known sensitizing dyes. This quantity amounts to about 10 to 20 milligrams per 1 kg. of emulsion ready for being cast which contains about 9 per cent of gelatin, 4.5 per cent of silver-halide, the rest being water. However we do not wish to limit our invention to the quantities just indicated, the most suitable amount will in each case be found by a few comparative experiments. The dyes may be added to the emulsion in form of solutions. Suitable solvents are the alcohols, for instance, methyl or ethyl alcohol which may be used anhydrous or diluted with water. The dyes are applied to the emulsion during any stage of its production, however, they are preferably added to the finished emulsion before being cast. The dyes may likewise be added by coating the emulsion with them or by bathing the finished photographic material in a bath in which the dye is dissolved. The dyes are suited for sensitizing an emulsion made according to the boiling process as well as for sensitizing an emulsion made according to the ammonia process.

The method of preparing the bases and the dyes from the bases is analogous to known methods. The method of preparing the dyes is as follows. 1 molecular proportion of the base, for instance, 2 methyl-naphtho-selenazole-ethyl-iodide and 2 molecular proportions quinoline-ethyl-iodide are dissolved for instance in methanol. This solution is mixed with one molecular proportion of sodium ethylate and the mixture is heated for a short time on the steam bath. The dye separates after a short time in form of the iodide and may be recrystallized from ethanol or methanol. According to the desired solubility the dye may be transformed into the salt of the corresponding acid.

In order to illustrate our invention we enumerate the following dyes which have been prepared according to the method just mentioned.

(1) 1.1'- diethyl-2.4'- (benzseleno-quino)-cyanine-iodide corresponding to the formula

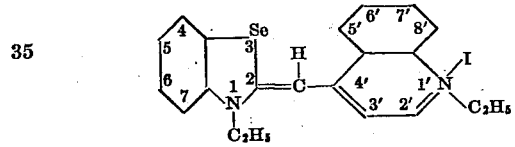

may be prepared by dissolving a mixture of 3 grams of 2.methyl-benzselenazole ethiodide and 3 grams of quinoline ethiodide in 50 cc. of methanol, adding 15 cc. of an alcoholic solution of sodiumethylate and boiling the mixture for about 15 minutes. From the mixture which assumes a red color the dye separates in the form of red flakes after cooling, on the addition of a few cc. of a solution of potassium iodide. Recrystallization from alcohol yields orange-red little rods. Absorption maximum of the alcoholic solution of the dye: about 510μμ. Range of sensibility of a gelatino-silver-bromide emulsion containing about 4 per cent of silver-iodide and having incorporated the dye: about 500μμ to about 590μμ with a maximum at about 538μμ.

(2) 1.1'-diethyl-2.4'-(benzseleno-6'-methyl-quino)-cyanine-iodide corresponding to the formula

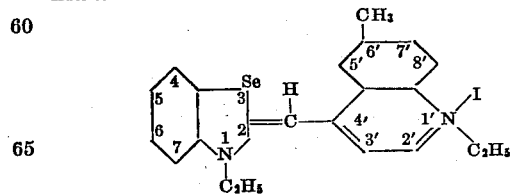

may be prepared in the manner described in Example 1 when using toluquinoline ethiodide instead of quinoline ethiodide. By recrystallization from alcohol the dye is obtained in the form of orange-red prismatic crystals. Absorption maximum of the alcoholic solution of the dye: about 513μμ. Range of sensibility of a gelatino-silver-bromide emulsion containing about 4 per cent of silver-iodide and having incorporated the dye: about 500μμ to about 595μμ with a maximum at about 540μμ.

(3) 1-methyl-1'-ethyl - 2.4' - (benzseleno - 6' - methylquino)-mesomethyl-cyanine - iodide corresponding to the formula

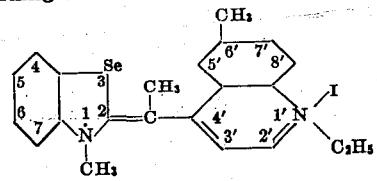

may be prepared in the manner described in Example 1 when starting from 2 - ethylbenzselenazole - methiodide and p - toluquinoline-ethiodide. Absorption maximum of the alcoholic solution of the dye: about 513μμ. Range of sensibility of a gelatino-silver-bromide emulsion containing about 4 per cent of silver-iodide and having incorporated the dye: about 500μμ to about 590μμ with a maximum at about 538μμ.

(4) 1,1'-diethyl-2.4'-(6.6'-dimethoxy - benzseleno-quino)-cyanine-iodide corresponding to the formula

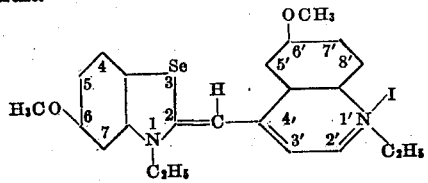

may be prepared in the manner described in Example 1 when starting from 2-methyl-5-methoxy-benselenazole-ethiodide and 6-methoxy-quinoline-ethiodide. Absorption maximum of the alcoholic solution of the dye: about 525μμ. Range of sensibility of a gelatino-silver-bromide emulsion containing about 4 per cent of silver-iodide and having incorporated the dye: about 500μμ to about 620μμ with a maximum at about 550μμ.

(5) 1.1'-diethyl-2.4'-(6-ethoxy - benzseleno-6-methyl-quino)-cyanine-iodide corresponding to the formula

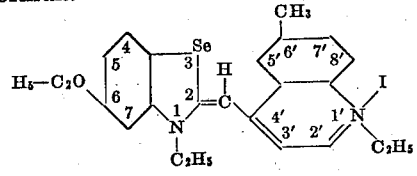

may be prepared in the same manner described in Example 1 when starting from 2-methyl-5-ethoxy - benzselenazole - ethiodide and p - toluquinoline-ethiodide. Absorption maximum of the alcoholic solution of the dye: about 520 μμ. Range of sensibility of a gelatino-silver-bromide emulsion containing about 4 per cent of silver-iodide and having incorporated the dye: about 500μμ to about 610μμ with a maximum at about 550μμ.

(6) 1.1'- diethyl-2.4'-(6-chloro - benzseleno-8'-methoxyquino)-cyanine-iodide corresponding to the formula

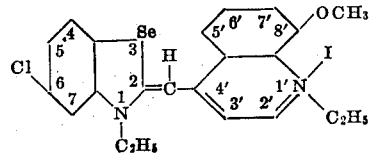

may be prepared in the same manner described in Example 1 when starting from 2-methyl-5-chlorobenzselenazole-ethiodide and 8-methoxy-quinoline-ethiodide. Absorption maximum of the alcoholic solution of the dye: about 515μμ. Range of sensibility of a gelatino-silver-bromide emulsion containing about 4 per cent of silver-iodide and having incorporated the dye: about 500μμ to about 590μμ with a maximum at about 538μμ.

(7) 1.1'- diethyl - 2.4-(5 - iodo - benzseleno-7'-methyl-quino)-cyanine-iodide corresponding to the formula

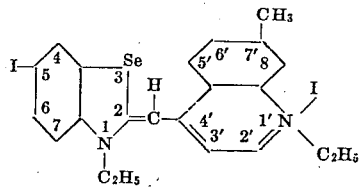

may be prepared in the same manner described in Example 1 when starting from 2-methyl-5-iodobenzselenazole-ethiodide and 7-methylquinoline-ethiodide. Absorption maximum of the alcoholic solution of the dye: about 515μμ. Range of sensibility of a gelatino-silver-bromide emulsion containing about 4 per cent of silver-iodide and having incorporated the dye: about 500μμ to about 590μμ with a maximum at about 538μμ.

(8) 1-methyl-1'-ethyl-2.4' - (6 - methyl - benzseleno-5',6'-benzo-quino)-cyanine-chloride corresponding to the formula

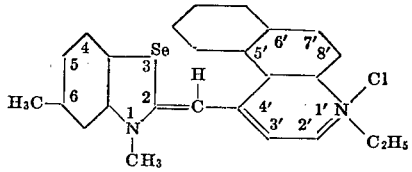

may be prepared in the same manner described in Example 1 when starting from 2.5-dimethyl-benzselenazole-methiodide and 5.6-benzoquinoline-ethiodide. Absorption maximum of the alcoholic solution of the dye: about 535μμ. Range of sensibility of a gelatino-silver-bromide emulsion containing about 4 per cent of silver-iodide and having incorporated the dye: about 500μμ to about 630μμ with a maximum at about 560μμ.

(9) 1-methyl-1' - ethyl - 2.4' - (4.5 - benzobenzseleno-6-methyl-quino)-cyanine-chloride corresponding to the formula

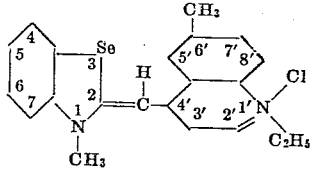

may be prepared in the same manner described in Example 1 when starting from 2-methylbenz-selenazole-methiodide and p-toluquinoline-ethiodide. Absorption maximum of the alcoholic solution of the dye: about 535μμ. Range of sensibility of a gelatino-silver-bromide emulsion containing about 4 per cent of silver-iodide and having incorporated the dye: about 500μμ to about 630μμ with a maximum at about 560μμ.

Our invention is not limited to the foregoing examples nor to the specific details given therein. Numerous other embodiments are possible and we contemplate as included within our invention all such modifications and equivalents as fall within the scope of the appended claims. So, for instance, the benzene nuclei may contain one or more substituents. The nomenclature used is arbitrary, but it is familiar to every chemist skilled in the art and has the advantage of clearness. Numbering of the selenazole bases is commenced from the selenium atom, and numbering of the dyes is commenced from the nitrogen atom.

What we claim is:

1. A photographic material comprising a silver-halide emulsion containing a selenoisocyanine corresponding probably to the formula

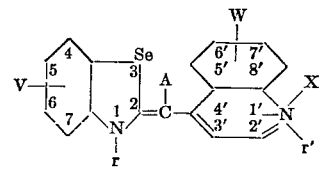

V=H, alkyl, alkoxy, halide and benzo,
W=alkyl, alkoxy and benzo,
r and r'=alkyl,
A=H, methyl,
X=an anion capable of precipitating the dye.

2. A photographic material comprising a silver-halide emulsion containing 1.1'-diethyl-2.4'-(benzseleno-quino)-cyanine-iodide corresponding probably to the formula

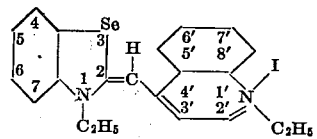

3. A photographic material comprising a silver-halide emulsion containing 1.1'-diethyl-2.4'-(6,6'-dimethoxy - benzseleno - quino) - cyanine - iodide corresponding probably to the formula

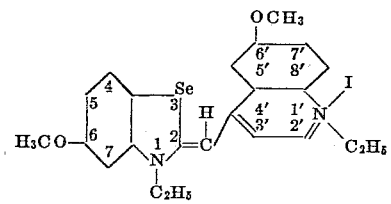

4. A photographic material comprising a silver-halide emulsion containing 1-methyl-1'-ethyl-2.4'-(4.5-benzobenzseleno-6-methyl - quino) -cyanine-chloride corresponding probably to the formula

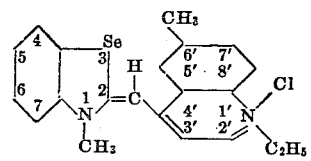

5. A photographic material comprising a gelatino-silver-bromide emulsion containing about 4 per cent of silver iodide sensitized with 1.1'-diethyl-2-4'- (benzseleno-quino) -cyanine - iodide corresponding probably to the formula

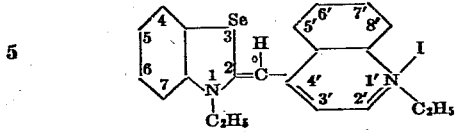

and having a range of sensibility from about $500\mu\mu$ to about $590\mu\mu$ with a maximum at about $538\mu\mu$.

6. A photographic material comprising a gelatino-silver-bromide emulsion containing about 4 per cent of silver iodide sensitized with 1.1'-diethyl-2.4'-(6.6'-dimethoxy - benzseleno - quino)-cyanine-iodide corresponding probably to the formula

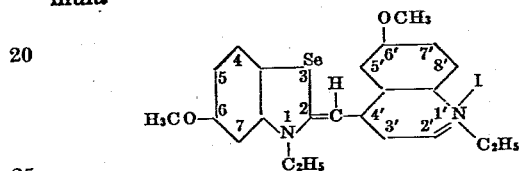

and having a range of sensibility from about $500\mu\mu$ to about $620\mu\mu$ with a maximum at about $550\mu\mu$.

7. A photographic material comprising a gelatino-silver-bromide emulsion containing about 4 per cent of silver iodide sensitized with 1-methyl-1'-ethyl-2.4'- (4.5-benzo-benzseleno - 6'- methylquino)-cyanine chloride corresponding probably to the formula

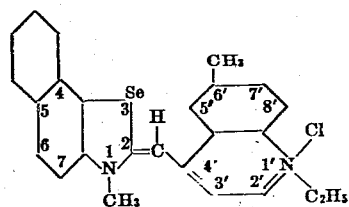

and having a range of sensibility of from about $500\mu\mu$ to about $630\mu\mu$ with a maximum at about $560\mu\mu$.

8. A photographic material comprising a silver halide emulsion containing a selenoisocyanine salt.

9. A photographic material comprising a silver halide emulsion containing a selenoisocyanine salt being substituted at the central carbon atom by an alkyl group.

10. A photographic material comprising a silver halide emulsion containing a dye selected from the group consisting of 1-methyl-1'-ethylbenzseleno-isocyanine salts and 1.1'-diethyl-benzseleno-isocyanine salts.

WALTER DIETERLE.
WALTER ZEH.